Sept. 28, 1937.                J. C. CROWLEY                2,094,264
                                VALVE STEM
                           Filed March 26, 1934
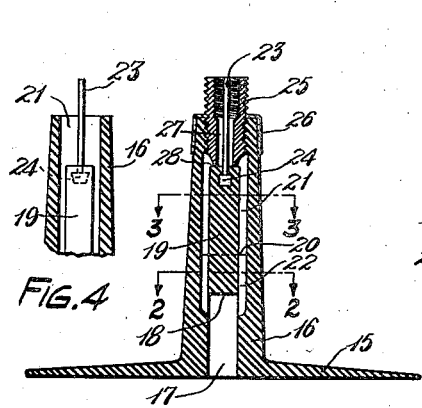
Fig.4  Fig.1
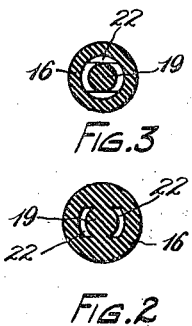
Fig.3
Fig.2
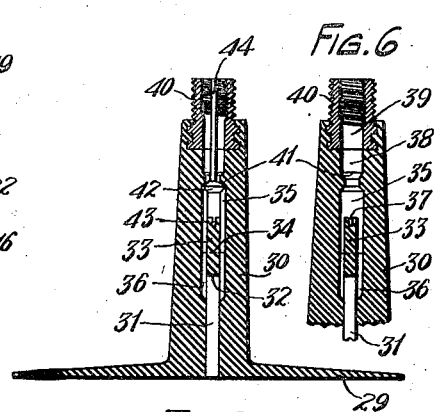
Fig.6  Fig.5
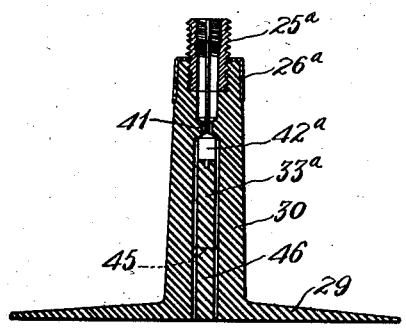
Fig.7
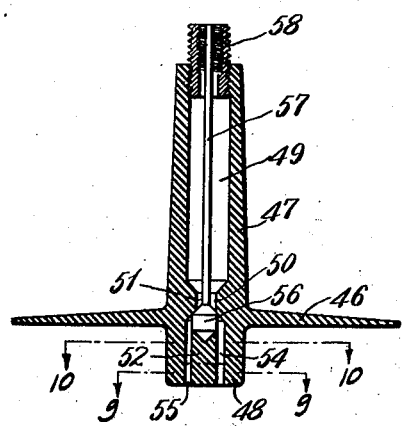
Fig.8
Fig.10
Fig.9
INVENTOR
JOHN C. CROWLEY
Kwis, Hudson & Kent
ATTORNEYS Patented Sept. 28, 1937

2,094,264

UNITED STATES PATENT OFFICE 2,094,264

VALVE STEM

John C. Crowley, Cleveland Heights, Ohio, assignor to The Dill Manufacturing Company, Cleveland, Ohio, a corporation of Ohio Application March 26, 1934, Serial No. 717,327

2 Claims. (Cl. 152—12)

This invention relates to a valve stem and valve for inflatable articles, such, for example, as pneumatic tires.

An object of the invention is to provide a combined valve stem and valve, thus eliminating the use of a separate valve insides in the stem.

Another object is to provide a combined valve stem and valve, such as above specified, which is constructed in its major part of molded rubber.

A further object is to provide a combined valve stem and valve structure which comprises a minimum number of parts that will not readily wear out or become inoperative and, in fact, will last for the life of the tire tube to which it is attached.

Further and additional objects and advantages will become apparent hereinafter during the following description of several embodiments of the invention which are illustrated in the accompanying drawing, wherein Figure 1 is a sectional view on a somewhat enlarged scale of one form of valve stem and valve embodying the present invention;

Figs. 2 and 3 are transverse sectional views taken substantially on lines 2—2 and 3—3, respectively, of Fig. 1, looking in the direction of the arrows;

Fig. 4 is a partial view similar to Fig. 1 but showing the metal insert omitted from the stem;

Fig. 5 is a sectional view of a different form of valve stem and valve from that shown in Fig. 1;

Fig. 6 is a fragmentary view similar to Fig. 5 showing the stem as it is molded and before the valve pin and valve have been added thereto;

Fig. 7 is a view similar to Figs. 1 and 5 of a still different form of the invention from that shown in said figures;

Fig. 8 is also a sectional view of a further modified form of the invention from any of the illustrated forms; and Figs. 9 and 10 are sectional views taken substantially on lines 9—9 and 10—10, respectively, of Fig. 8.

Referring to Figs. 1 to 4 inclusive, the valve stem and valve illustrated therein comprises a molded rubber stem having a base 15 diminishing in thickness from its center towards its circumference and a stem proper 16 extending from the center of the base, such stem being illustrated as slightly tapering toward its outer end, but it should be understood that the stem could be straight equally as well.

The stem and base are molded with a circular bore 17 extending from the under side of the base to the line 18, as shown in Fig. 1. At such point the bore 17 terminates and a portion 19 extends toward the outer end of the stem, which portion is integrally connected with the stem between the line 18 and the line 20, as indicated in Figs. 1 and 2. The portion 19 outwardly of the line 20 is substantially circular in shape and there is an intervening circular space between the portion 19 and the wall of a circular bore 21 formed in the stem outwardly of the point 20. The bore 17 and the bore 21 are connected by an arcuate slot or slots 22 extending from the point 20 downwardly at the sides of the portion 19 to a point below the line 18. In other words, the air passageway through the stem is formed by the bore 17, the arcuate slots 22, and the annular space between that part of the portion 19 outwardly of the line 20 and the wall of the bore 21. When the stem is being molded, a valve pin 23 may have its enlarged head 24 molded directly in the outer end of the portion 19. Inasmuch as the portion 19 from the line 20 to its outer end is disconnected from the stem, it will be evident that such portion may be compressed by pushing inwardly on the valve pin 23 and, when such pressure is released, the portion 19 will assume its original position due to the resilience of the rubber.

The portion 19 terminates inwardly of the outer end of the stem and there is arranged within the bore 21 at the outer end of the stem a metal insert 25 which is externally threaded and which extends beyond the end of the rubber stem and furnishes a portion for receiving a valve or dust cap or an air chuck. When the insert 25 is positioned in the stem, the threads thereof will bite into the material of the stem, and when a clamping ferrule 26 is mounted upon the outer end of the stem, the insert and stem will be securely locked together.

A passage 27 extends through the insert and receives the valve pin 23, such passage having a reduced portion located inwardly of the stem and an enlarged threaded portion located exteriorly of the stem, such latter portion being for the purpose of permitting a pump coupling or other fitting to be screwed interiorly of the stem. The inner end of the insert is of conical shape and a valve seat 28 is thus formed at such end against which seats the upper end of the portion 19.

The base 15 of the stem may be vulcanized directly to a tire tube and the stem and tube in effect made integral. When the tire tube equipped with such stem is mounted in the casing and placed upon a wheel rim, the stem will be pulled through the rim opening and, when the tube is inflated, will be held in extended position.

In inflating the tube, an air chuck or other fitting on an air line is applied to the outer end of the insert 25 and the valve pin 23 depressed, which in turn causes a compression of the portion 19 of the stem to move the upper end of said portion off the seat 28 and thus provides an uninterrupted air passageway into the tube, such passageway including the passage through the insert, the annular space between the portion 19 and the wall of the bore 21 in the stem, the arcuate slots 22, and the bore 17. When the tube has been properly inflated, removal of the air chuck allows the portion 19 to assume its normal position with its upper end in sealing engagement with the seat 28. Of course, an air gauge or other device can be applied to the outer end of the insert and the end of the portion 19 moved off its seat 28 in a similar manner.

It will be noted that the passageways for the air through the stem are of ample magnitude to allow quick inflation and deflation of the tube and that the valve and stem, being one integral molded structure, is sturdy and will last for the life of the tube.

A combined valve stem and valve, such as has just been described, possesses the advantage of being inexpensive inasmuch as it eliminates the necessity of the use of separate valve insides in the stem. Of course, the stem also possesses the useful function of a rubber stem which allows the stem to pull through the rim opening in the case of quick deflation of the tube, such as occurs with a puncture or blow-out.

In Figs. 5 and 6 another form of stem from that just described is illustrated, this latter stem comprising a base 29 similar to the base 15 and a stem proper 30. There is a bore 31 extending from the inner side of the base outwardly of the stem to the point 32 which is the inner end of an internal portion 33 similar to but smaller than the portion 19 in the first mentioned form, such portion 33 being integrally connected to the stem between the points 32 and 34. Outwardly of the point 34 the portion 33 lies in a bore 35, there being an annular space between the portion 33 and the wall of the bore. The bore 35 is connected to the bore 31 by means of arcuate slots 36 similar to the arcuate slots 32 and extending on opposite sides of the portion 33 from the point 34 downwardly below the point 32. The outer end of the portion 33 is provided with a transverse groove 37 for a purpose later to be explained.

The stem 30 at its outer end is provided with a bore 38 communicating with a passage 39 through a metal insert 40 which has its inner end provided with annular laterally projecting ribs and is arranged in a counterbore at the outer end of the stem. The insert 40 has a threaded end projecting beyond the end of the stem similar to the insert 25 and is molded into the end of the stem 30, as indicated in Fig. 6. The bores 35 and 38 through the stem are connected by a restricted passage formed by an inwardly extending annular tapered projection 41 integral with the stem and providing a tapered or conical seat on its under side against which a conical valve 42 can seat. The conical valve 42 carries an inwardly extending portion having at its inner end a projection 43 interfitting the slot 37 in the outer end of the portion 33 of the stem. The valve 42 also carries an outwardly extending valve pin 44, the outer end of which lies substantially flush with the outer end of the insert 40.

In mounting the valve in the stem the valve 42 and its extension are forced through the opening defined by the internal projection 41 of the stem, it being understood that since the stem is formed of rubber said opening may be sufficiently distorted under force to allow the valve to be pushed therethrough. The extension 43 of the valve will engage in the slot 37 of the portion 33 of the stem and the valve and portion 33 will then move together. Although the valve may be pushed through the opening defined by the projection 41 it will be understood that when once mounted the air pressure will not be sufficient to force the valve outwardly through said opening and that the conical valve will bear against the complementary conical seat afforded by the under side of the projection 41 and thus seal the passageways through the stem.

The use and operation of the valve stem shown in Figs. 5 and 6 are similar to those referred to with respect to the form shown in Fig. 1.

The stem shown in Fig. 7 is similar to that shown in Figs. 5 and 6 and the like parts thereof will be correspondingly numbered. This latter stem, however, differs from the former in that the portion 33a extends from the inner side of the base outwardly of the stem to the valve 42a and is integrally connected to the stem from the point 45 to the inner end of the stem. Slots 46 formed in the stem below the point 45 connect the interior of the tube with the annular space surrounding the portions 33a outwardly of the point 45.

In place of an insert molded into the outer end of the stem, as is the insert 40 in the form shown in Figs. 5 and 6, an insert 25a is arranged therein and clamped in position by means of a clamping ferrule 26a similar to the construction shown in Fig. 1.

In Figs. 8, 9, and 10 a still further form of the invention is disclosed and comprises a base 46 from which centrally project in opposite directions a relatively long stem 47 and a relatively short stem 48, the latter stem being arranged on the inner side of the base. The stem 47 is provided with a longitudinal relatively large bore 49 extending from the outer end of the stem inwardly to an annular inwardly extending tapered shoulder 50 integral with the stem, said shoulder providing a restricted bore 51. The short stem 48 has an internal portion 52 extending centrally thereof and integral therewith from the line 53 to the inner end of the stem. The portion 52 from the line 53 to the outer end of the portion lies in a bore 54 in the stem and there is thus provided an annular space between the portion 52 and the wall of the bore. Slots 55 extend from the point 53 along the sides of the portion 52 to the inner end thereof and connect the bore 54 with the interior of the tire tube when the stem is mounted thereon.

A conical valve 56 is forced through the restricted opening 51 defined by the shoulder 50 in a manner similar to that described with reference to the valve 42 of Fig. 5. The valve 56 at its inner end has a conical portion which sets in a complementary recess formed in the outer end of the portion 52 and it will be noted that the outer end of the valve 56 will be held in seating engagement by the portion 52 against the tapered or conical inner surface of the shoulder 50 and the air passageway through the stem maintained closed. The valve 56 also carries an outwardly extending valve pin 57, the outer end of which lies within the passage through a suitable metal insert 58, such insert being somewhat similar to the previously described inserts and serving the same purpose.

Although several embodiments of the invention have been illustrated and described herein, it should be understood that the invention is susceptible of various modifications and adaptations within the scope of the appended claims.

Having thus described my invention, I claim:

1. A combined valve and valve stem comprising a molded rubber stem adapted to be connected to a tire tube, said stem being provided with a bore extending inwardly from the outer end of the stem toward its inner end and a bore extending from the inner end of the stem toward its outer end, a portion integrally molded interiorly of said stem between said bores and extending into said first named bore, a slot formed in said stem adjacent said portion and connecting said bores, means intermediate the ends of said first bore forming a restricted opening and a seat, and means at the outer end of said portion normally seated on said first named means to seal the opening therein.

2. A combined valve and valve stem comprising a molded rubber stem adapted to be connected to a tire tube, said stem being provided with a bore extending inwardly from the outer end of the stem toward its inner end and with a bore extending from the inner end of the stem toward its outer end, a portion integrally molded in said stem between said bores and extending into said first named bore, a slot formed in said stem adjacent said portion and connecting said bores, and a tubular insert secured in said first named bore and forming a passage having at its inner end a seat, the outer end of said portion normally seating against the inner end of said insert to seal the passage therethrough.

JOHN C. CROWLEY.